(12) United States Patent
Belanger (10) Patent No.: US 8,453,657 B2
(45) Date of Patent: Jun. 4, 2013

(54) METHOD AND APPARATUS FOR ASSISTING THE DRIVER OF A VEHICLE TO CENTER THE VEHICLE IN A WASH BAY

(71) Applicant: Belanger, Inc, Northville, MI (US)

(72) Inventor: Michael J. Belanger, Novi, MI (US)

(73) Assignee: Belanger, Inc., Northville, MI (US)

( * ) Notice: Subject to any disclaimer, the term of this patent is extended or adjusted under 35 U.S.C. 154(b) by 0 days.

(21) Appl. No.: 13/650,174

(22) Filed: Oct. 12, 2012

(65) Prior Publication Data

US 2013/0032183 A1 Feb. 7, 2013

Related U.S. Application Data

(60) Division of application No. 13/025,466, filed on Feb. 11, 2011, which is a continuation-in-part of application No. 12/707,777, filed on Feb. 18, 2010.

(60) Provisional application No. 61/333,480, filed on May 11, 2010.

(51) Int. Cl.
*B08B 3/02* (2006.01)

(52) U.S. Cl.
USPC ............ 134/113; 134/123; 134/198; 134/199

(58) Field of Classification Search
None
See application file for complete search history.

(56) References Cited

U.S. PATENT DOCUMENTS

| 5,786,758 | A | * | 7/1998 | Bullock | 340/539.32 |
| 7,438,075 | B1 | * | 10/2008 | Huntington et al. | 134/57 R |
| 2006/0157093 | A1 | * | 7/2006 | Belanger | 134/123 |

* cited by examiner

*Primary Examiner* — Michael Kornakov
*Assistant Examiner* — Ryan Coleman
(74) *Attorney, Agent, or Firm* — Young Basile Hanlon & MacFarlane PC (57) ABSTRACT

A vehicle washing system associated with a bay in which a vehicle is parked during the washing operation is equipped with a centering target which can be selectively deployed upon entry of a vehicle to assist the driver in placing the vehicle on the longitudinal centerline of the effective washing area in the bay. The target may be provided by a vertically-depending spray arm having internal LEDs which are illuminated in a flashing effect during vehicle entry and in constant colors during the washing program. Several alternative target arrangements are described.

13 Claims, 12 Drawing Sheets

METHOD AND APPARATUS FOR ASSISTING THE DRIVER OF A VEHICLE TO CENTER THE VEHICLE IN A WASH BAY

RELATED APPLICATIONS

This application is a divisional of U.S. patent application Ser. No. 13/025,466 filed Feb. 11, 2011, currently pending, which is a continuation-in-part of U.S. application Ser. No. 12/707,777 filed Feb. 18, 2010, currently pending and U.S. Provisional Application Ser. No. 61/333,480 filed May 11, 2010. The content of the U.S. patent application Ser. Nos. 13/025,466, 12/707,777 and 61/333,480 are incorporated herein by reference.

FIELD OF THE INVENTION

This invention relates to vehicle washing systems and more particularly to a method and apparatus for assisting the driver of a vehicle entering a wash bay to position the vehicle on the centerline of the equipment envelope in the bay.

BACKGROUND OF THE INVENTION

It is common for automatic car wash systems of the conveyor type to employ a means for properly positioning vehicles at a point of entry. Conveyor systems may use tire guides not only to force a vehicle into a proper entry position but also to guide the vehicle through the various stations from entry to exit.

For non-conveyor washers such as "touchless automatic" systems using pressurized streams of sprayed fluids to wash and rinse vehicles, it is known to use various devices including off-center treadles to determine when a vehicle is in a proper position to be washed. Treadles, by their very nature, may position the left or driver's side of a vehicle, but do not purport to center a vehicle in a bay.

SUMMARY OF THE INVENTION

In accordance with the present invention, visual assistance is given to the driver of a vehicle during the approach or entry to a non-conveyor wash bay to promote navigation of the vehicle toward a position in the bay which will substantially align the centerline of the vehicle with the centerline of the working envelope of the vehicle wash system. In general, this is accomplished by providing a visual target in the bay which identifies the longitudinal centerline of the equipment envelope in the bay during the approach or entry of the vehicle to the bay. The target is typically brought into position during the vehicle entry, and thereafter removed to another position before the wash process begins.

In one embodiment of the invention, a target is selectively deployed to an operative position when it is determined that a vehicle is entering the bay. The target may be positioned toward or near the far or "exit" end of the bay and on (above) the centerline of the effective envelope of the wash system. The "envelope" may, for example, be the outer boundaries of the path of a spray arm or set of arms which move around a vehicle. It may also be positioned more forwardly, for example, in or toward the geographic center of the bay, and slowly moved along the centerline toward the rear of the bay to encourage a driver to draw the vehicle to the target. In a preferred embodiment, the target is illuminated in such a way as to call attention to the target.

In other embodiments of the invention hereinafter described in detail, the target may, after performing the approach/entry centering function, be either stowed or, where the target is an active component of the wash system, moved to a position where it may begin to perform one or more functions in the washing operation. An example of the latter more fully described herein is a target in the form of a vertically depending, lighted spray arm carrying a series of nozzles for dispensing washing and rinsing fluids. In that embodiment, the arm can be caused to move from a standby position to a target position on entry of a vehicle and, thereafter, to a functional position in a wash program where it assumes an active role in delivering washing and rinsing fluids to the external surfaces of the properly positioned vehicle.

As hereinafter described in greater detail, the spray arm may be selectively and variously illuminated. Our preferred approach is to equip the arm with internal lighting means such as LEDs which can produce a variety of lighting effects during the time the arm serves as a target as well as during the time it takes an active role in carrying out the washing and rinsing functions. For example, the spray arm may be lighted in a single color, but in a flashing or intermittent style, to draw attention to itself during the target function period. The LEDs may thereafter progress through a series of different lighting effects, such as different colors, to provide confirmation to the customer that various washing and rinsing functions which are expected are being carried out.

Alternatively, the target may be externally illuminated; this is particularly useful where the target plays no role in the washing or rinsing functions but serves only the function of providing a visual aid to help position a vehicle. For example, a target may be deployed on an arm which pivots or telescopes into position on the bay centerline and is thereafter stowed after the vehicle is in position so as to be out of the way of the wash systems components.

In still another embodiment of the invention, twin laterally opposite spray arms may be variously positioned to serve as a navigation aid. For example, the arms are brought together in adjacent or even touching side-by-side positions at or near the exit end of the bay to serve as a centering target. Again, the spray arms may be equipped in such a way as to provide internal lighting or may be externally illuminated or otherwise highlighted during various phases of the approach and washing functions.

It will be apparent to persons skilled in the car wash art that there are a wide variety of apparatuses and techniques which are available to provide centering assistance and navigational assistance to the driver of the vehicle entering a wash bay. In general, the method aspects of the present invention involves the identification of the approach or entry of a vehicle to a bay and the activation or deployment of a visual guide or target to show the driver of the entering vehicle where the centerline of the vehicle should be so that the driver may place the center of the vehicle at least approximately on that line. Advantages to the method and apparatus of the invention are numerous including optimizing the effectiveness of the washing and rinsing operations as well as reducing and/or eliminating the potential for damage as a result of inadvertent or unintentional contact between the vehicle and the structural components of the washing system.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENTS

Figure 1:
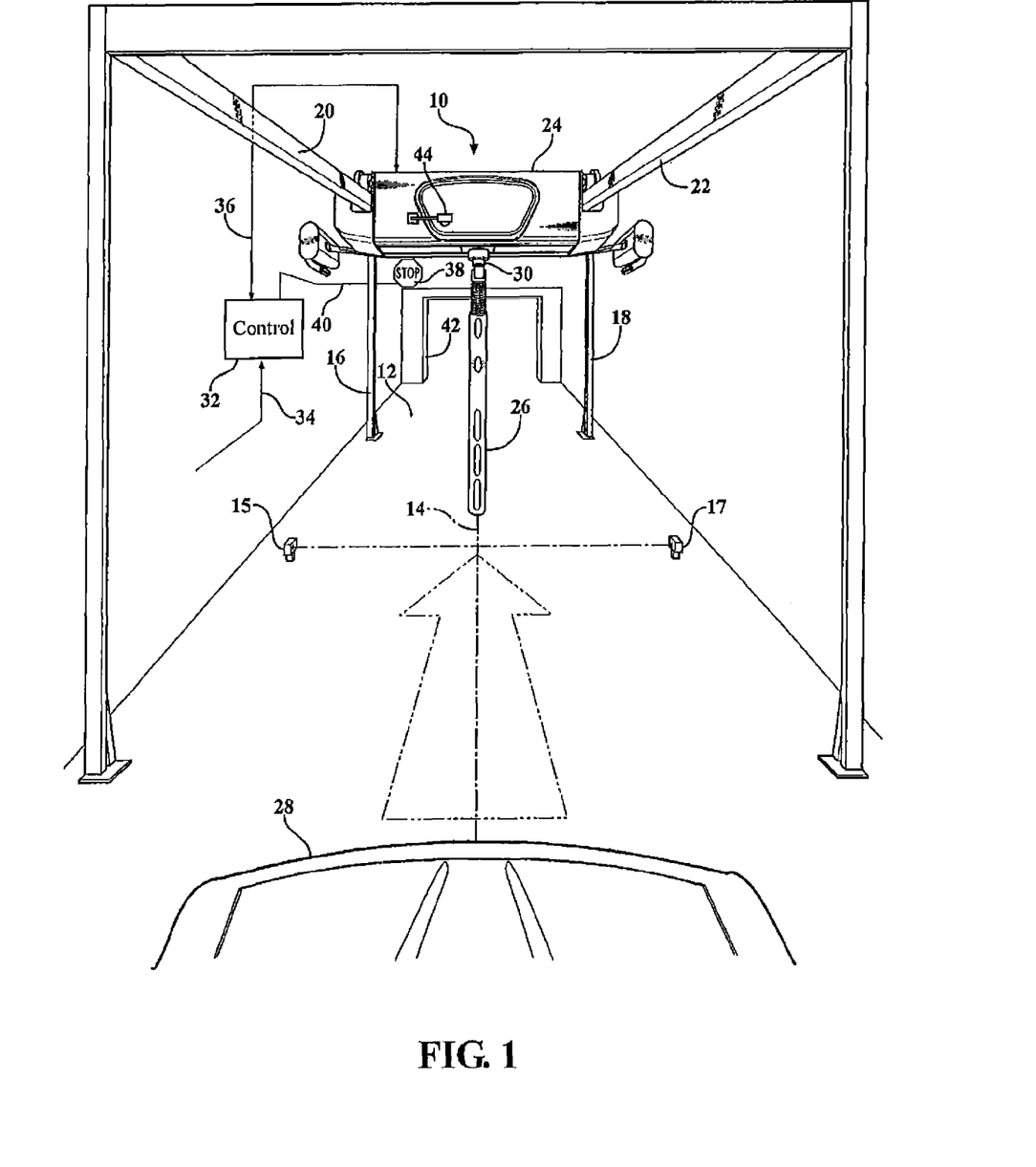
FIG. 1 is a perspective view of a touchless automatic car wash system in an enclosed car wash bay from the standpoint of the driver of a vehicle entering the bay.

Referring to FIG. 1 there is shown from the perspective of the driver of a vehicle 28 a car wash system 10 of the touchless automatic type operationally mounted within an enclosed bay having a floor 12. The apparatus 10 is essentially symmetrically arranged with respect to a longitudinal centerline 14. It will be understood that the illustration of an enclosed bay is exemplary only as it is fairly common to construct essentially open structures in warmer climates as well as to mount a car wash system such as system 10 in a partially defined or even undefined area of a larger building. Therefore, references in this document to the "centerline" are references to the centerline of the area circumscribed by dispensing component or components which travel around a vehicle, and do not necessarily denote the geographical center of the building structure or walls within which the dispensing components are installed. In short, the objective of the invention is to help center a vehicle relative to the equipment envelope rather than the centerline of the building structure in which the equipment is installed. Of course, these may be the same.

The system 10 comprises a number of laterally spaced-apart upright metal supports 16, 18 supporting an overhead railway consisting of spaced-apart parallel and longitudinally extending rails 20, 22. The supports 16, 18 are far enough apart laterally to accommodate vehicles of the type to be washed therebetween with adequate clearance for equipment. A carriage 24 is mounted on the railway 20, 22 and is equipped as hereinafter described for controlled and selective longitudinal movement along the railway during various phases of operation. The carriage may be decorated and lighted as desired.

The carriage 24 carries in depending relationship thereto an inverted L-shaped spray arm 26 with a breakaway joint at the intersection of the "L", FIG. 1 shows arm 24 in a "target position" essentially on the longitudinal centerline 14 where it can be readily seen by the driver of a vehicle 28 during entry into the bay 12. In FIG. 1, the carriage 24 is positioned at or near the far or exit end of the bay 12, the actual exit being defined in this case by an open doorway structure 42. The arm 26 is mounted to the carriage 24 by means of a complex pivot structure 30, details of which will be described with reference to FIGS. 2-4. At this point, suffice it to say that the pivot structure 30 allows the arm 26 to be rotated about a vertical pivot axis which, in this case, is orthogonal to and intersecting the centerline 14. In the embodiment of FIG. 1, the pivot 30 is fixed laterally. Other pivot arrangements are made and may be employed.

Longitudinal travel of the carriage 24 is carried out under the control of a program resident in memory in a conventional microprocessor-type control computer 32. The control computer 32 receives inputs on line 34 from a coin receiver or the like and on bus 36 from various sensors and transducers, including a sensor 44, carried by the carriage 24 and components mounted thereto as hereinafter explained. Controller 32 is preferably a programmable, general purpose computer but may alternatively comprise various conventional electronic components such as relays, switches and timers.

Figure 8:
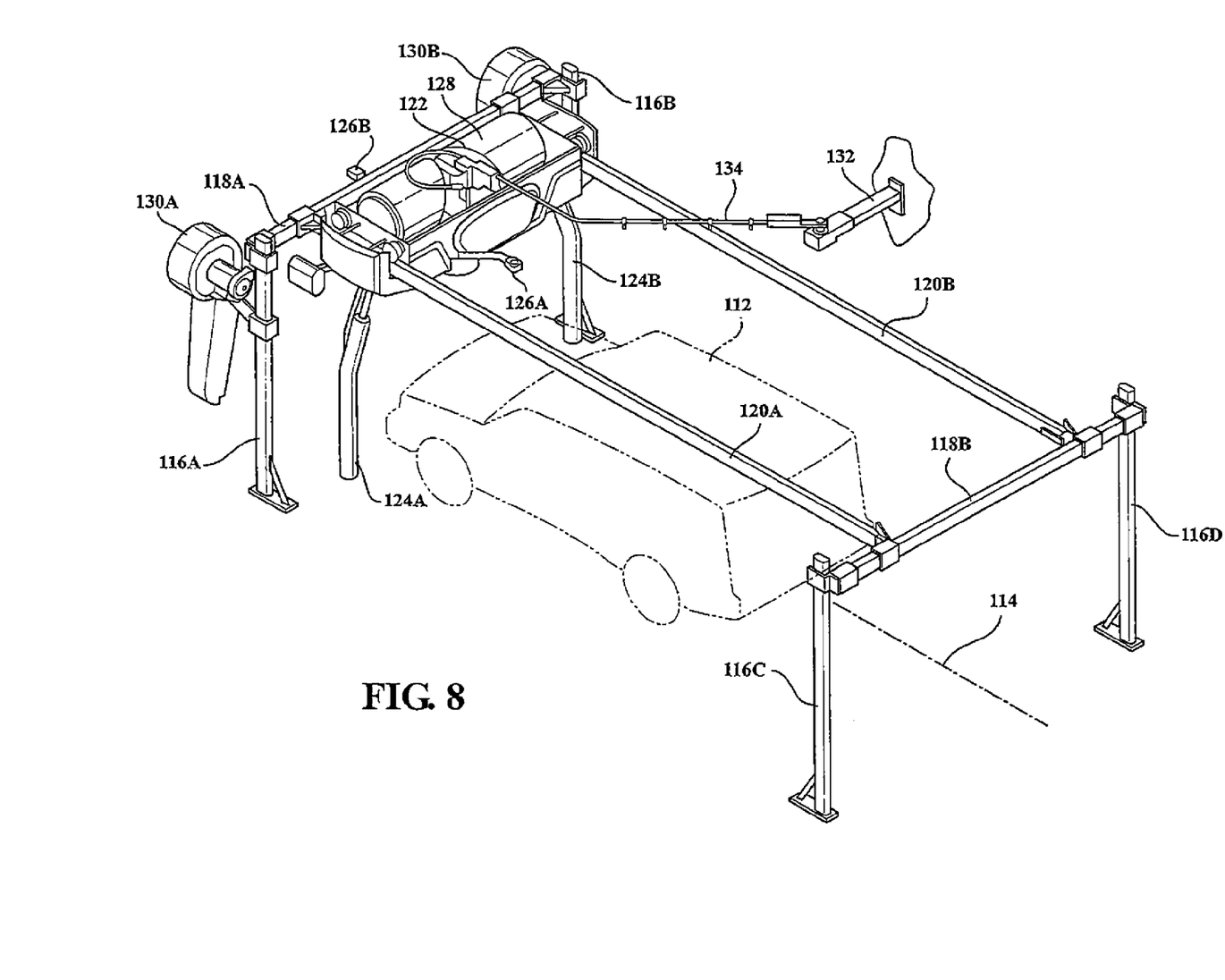
FIG. 8 is a perspective view of a car wash system employing the present invention and using two reversely similar depending spray arms.

A system for supplying washing and rinsing fluids to the carriage 24 from a chemical storage and mixing facility will also be provided but because it may be well known and conventional in nature, will not be described here. A suitable fluid distribution boom which accommodates carriage movement is seen in FIG. 8 and may be used in the same way in FIG. 1. Control computer 32 not only receives signals from sensors associated with the carriage 24 but also sends signals by way of bus 36 to the carriage 24 to carry out wash program steps in a controlled and sequential fashion as those steps are retrieved from memory in conventional fashion. The wash program may be simple and universal as to all customers or may offer extra cost optional features such as blow-drying, rustproofing, etc.

It is to be understood that while a "coin receiver" has been described as providing the initiating input on line 34 to controllers 32, an initiation or system activation signal may also come from a variety of other sources including a keyboard, a token receiver, an electric eye, and/or an instrumentality which is under the control of an attendant.

Finally, the system of FIG. 1 is provided with a sign 38 which receives signals provided by controller 32 on output line 40 to illuminate in such a way as to provide any or all of several messages including "stop", and "exit". The sign 38 is positioned where it may be seen at all relevant times by the driver of the vehicle 28. The size and position represented in FIG. 1 is an example only and may vary from one application to another.

Looking now at FIGS. 2-4, additional details of the carriage 24 and the structure associated therewith will be given.

Figure 2:
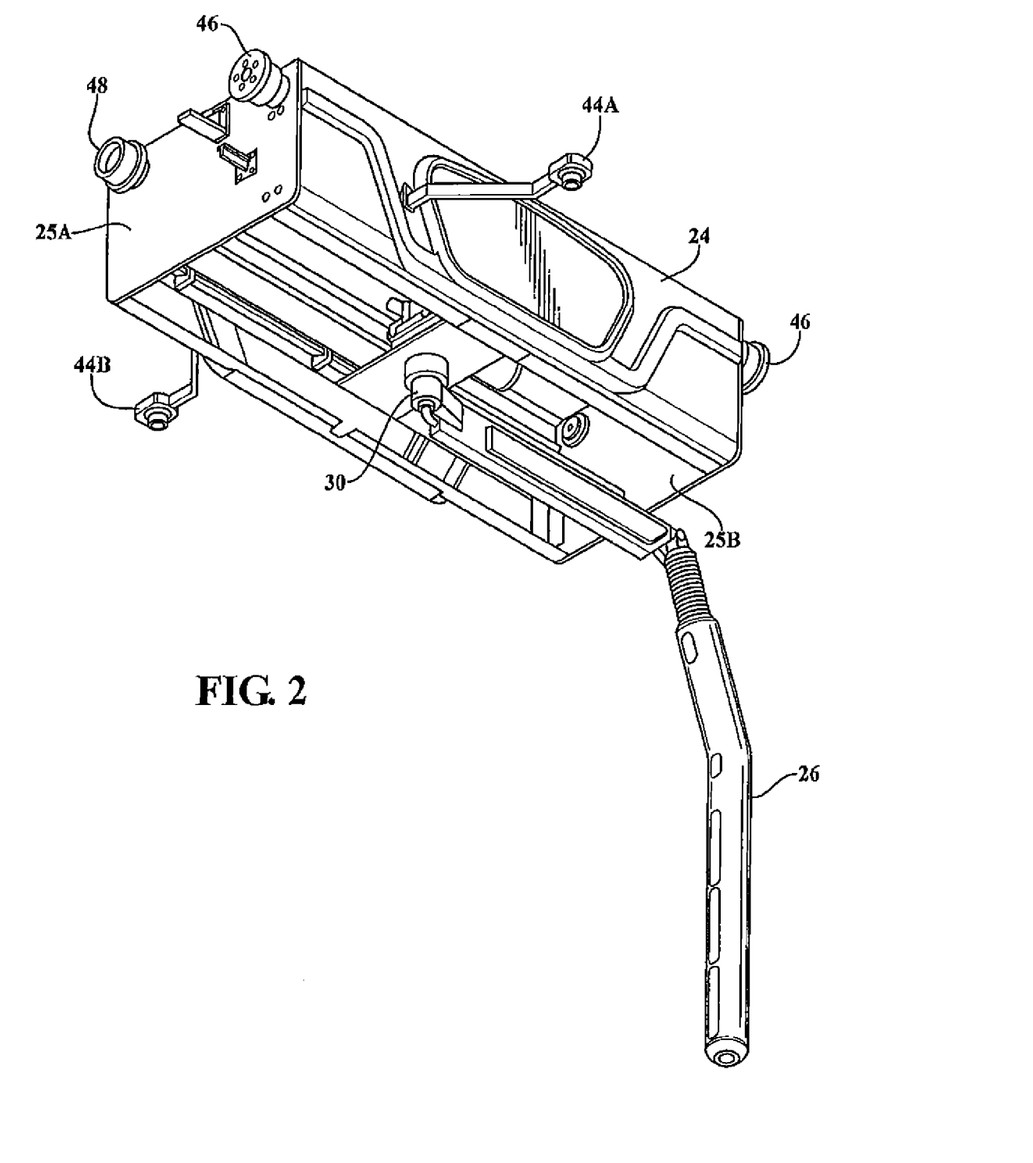
FIG. 2 is a perspective view of a carriage having a single depending spray arm in the system of FIG. 1.

As shown in FIG. 2, the carriage 24 may comprise end plates 25A, 25B joined by struts and sheet metal plastic covers to provide an aesthetically pleasing appearance. FIG. 2 also illustrates the fact that the carriage 24 is provided with two down-looking sonar-type sensors 44A, 44B of which sensor 44A is mounted on an arm extending from the carriage 24 toward the vehicle entry point while sensor 44 is mounted on an arm extending toward the exit 42. These sensors, together with controller computer 32, are capable of "finding" the front and rear ends of any vehicle 28 parked in the bay so as to provide information which determines the length of the longitudinal travel of carriage 24 during a washing operation thereby to avoid wasteful motion and over travel of the carriage 24, especially relative to the rear of a particularly short vehicle in the bay 12. As will be apparent to persons skilled in the art, the end of a vehicle is "found" and memorized by counting resolver pulses associated with carriage wheels as it moves from a home position to a position where one of the sensors 44 sees the floor of the bay. At this point, the pulse count represents a coordinate which can be used to control subsequent carriage movement. Finding and noting in memory the location of the ends of the vehicle 28 also to prevent inadvertent contact between the spray arm 26 and the vehicle 28 as it moves around the vehicle during the steps of a wash/rinse sequence. Details of a sonar system for locating the boundaries of a vehicle in a car wash bay can be found in U.S. RE 40,463 issued Aug. 26, 2008 to Belanger, Inc., the disclosure of which is incorporated herein by reference.

Figure 3:
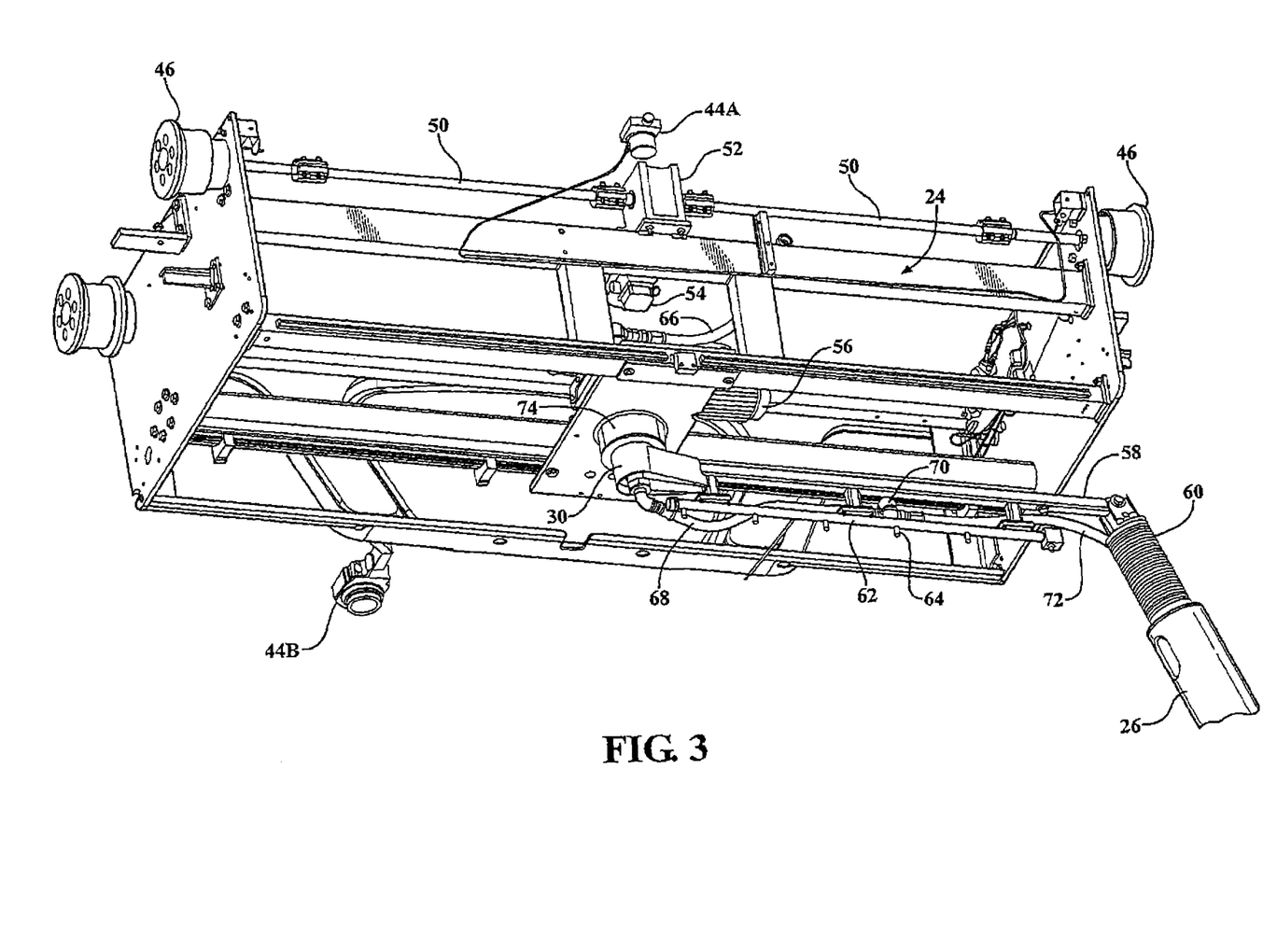
FIG. 3 is a more complete and detailed drawing of the carriage and arm structure of FIG. 2 but with the cover of the carriage removed to reveal internal components.
Figure 4:
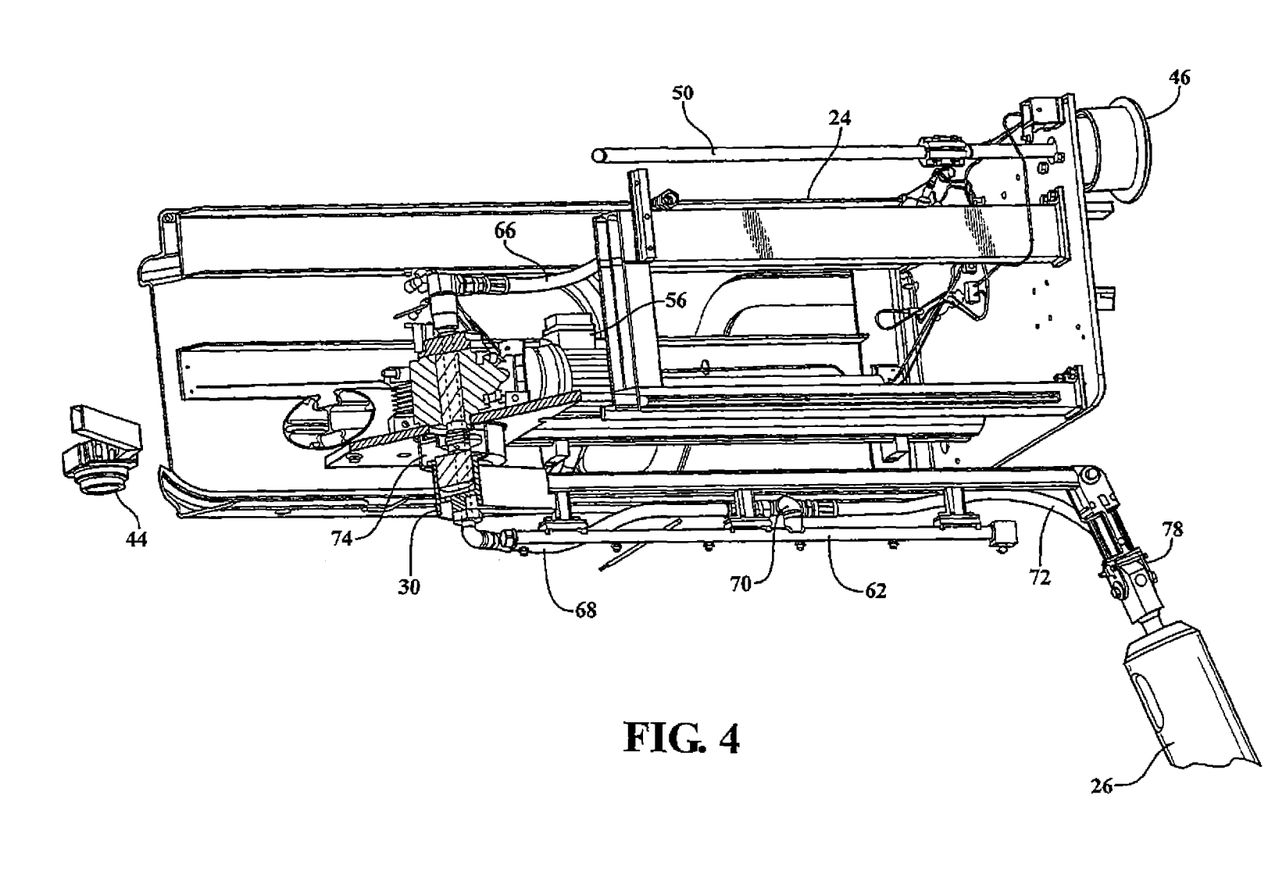
FIG. 4 is another perspective view of the carriage and arm structure of FIG. 3 with parts of the rotary pivot for the arm broken away to show how fluid and electrical power are supplied to the arm.

As also shown in FIGS. 2-4, the carriage 24 is provided with drive wheels 46 on the opposite side plates 25A, 25B which drive wheels rest on the rails 20, 22 of the overhead railway and provide traction for longitudinal motion over the railway. Additional idler wheels 48 are also provided on the carriage 24 for stabilization and/or signal generating purposes as explained above.

Looking now to FIGS. 3 and 4, it can be seen that drive shafts 50 are connected between the drive wheels 46 and a gear box 52 which is mounted on a pedestal on the center of the carriage 24 along with an electric motor 54 which is operatively connected to the gear box 52. The motor is reversible so that the carriage can be caused to travel in a programmed fashion and to a programmed degree in both forward and reverse longitudinal directions along the railway 20, 22 as hereinafter described.

A second motor/gear box combination 56 is also mounted on the carriage 24, in this case to cause rotation of the arm 26 as well as the upper horizontal arm 58 by way of which the arm 26 is connected to the pivot structure 30. A boot 60 wraps around the upper end of the arm 26 where it joins the horizontal arm portion 58 and contains a four-way breakaway knuckle hereinafter described in greater detail.

The arm 26 carries nozzles along its length as well as a horizontal manifold 62 which is equipped with a series of spaced-apart spray nozzles 64 to direct washing and rinsing fluids toward the top or horizontal surfaces of a vehicle 28 in the bay. The nozzles spaced along the length of arm 26 direct fluids outwardly toward the side, front and rear surfaces of the vehicle 28 during a washing and rinsing operation, suitable apertures being provided in the side of the plastic sleeve covering arm 26 as hereinafter described.

Fluids are supplied to the carriage structure by way of an input hose 66 which is coupled to a boom (shown in FIG. 8) extending outwardly from a wall of the bay. Hose 66 is coupled to a conduit which runs through the center of the pivot 30 by way of a rotatable fluid coupling in fluid communication with a supply conduit 68 which is connected to a T fitting 70 which supplies the fluid not only to the manifold 62 and nozzles 64 but also by way of flexible conduit 72 to a supply pipe running down the center of the arm 26 and connected to the various spray nozzles in the arm 26 as shown in FIGS. 5 and 6.

As is more fully described in the co-pending application, Ser. No. 13/025,503, filed concurrently herewith, the pivot structure 30 of the carriage 24 is also provided with a six-channel slip ring assembly 74 which provides electrical service to electrical devices, if any, carried by the arm 26. The slip ring assembly 74 allows the arm 26 to travel around the vehicles, such as 28, in one direction only without causing a "wind-up" problem with wiring extending from a fixed support to a rotary arm and requiring alternating reversals of the travel direction of the arm. In this case, the electrical devices carried by the arm 26 include LEDs as well as sensors associated with the four-way breakaway knuckle to provide a signal to control computer 32 to indicate that the arm 26 has been displaced away from its normal operating orientation.

FIG. 4 shows the carriage with the cover removed and provides a better illustration of the T-fitting 70, the slip ring structure 74 and the four-way breakaway knuckle 78. The knuckle 78 includes two orthogonally operative breakaway joints characterized by spring-loaded ball detents riding on semi-circular surfaces with center receptacles. Thus, the arm can be "broken-away" regardless of its orientation. A breakaway sensor signal is used to (a) stop system operation, (b) reverse arm travel for a short distance, (c) summon an attendant, or (d) all of these.

Figure 5:
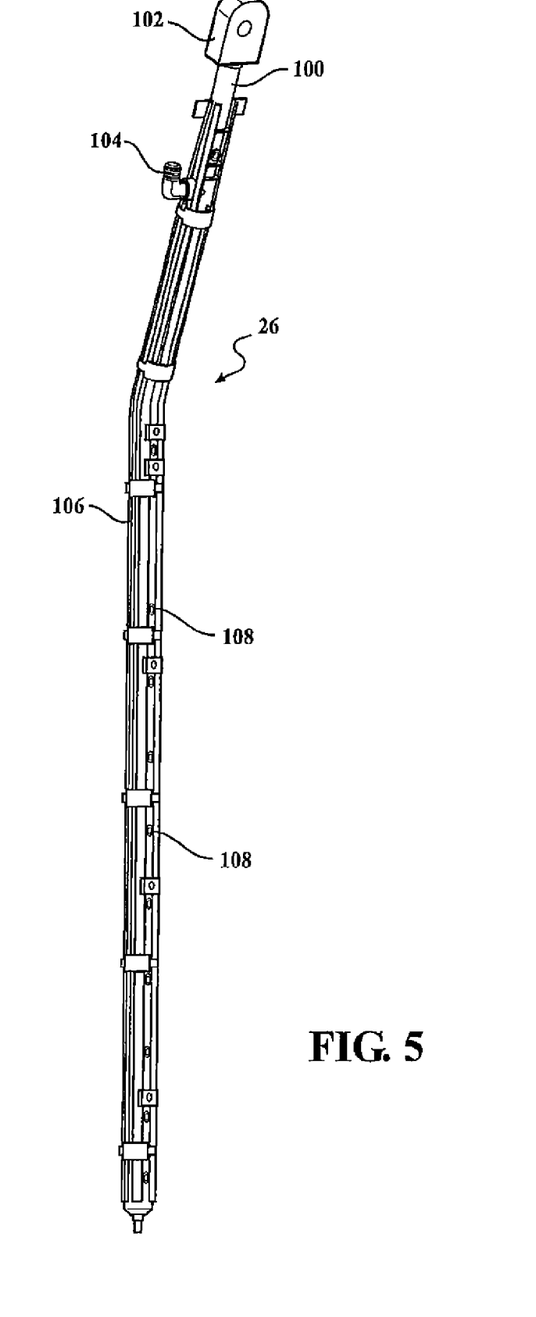
FIG. 5 is a perspective view of one possible spray arm construction from the apparatus of FIGS. 1-4 with the outer sleeve removed.
Figure 6:
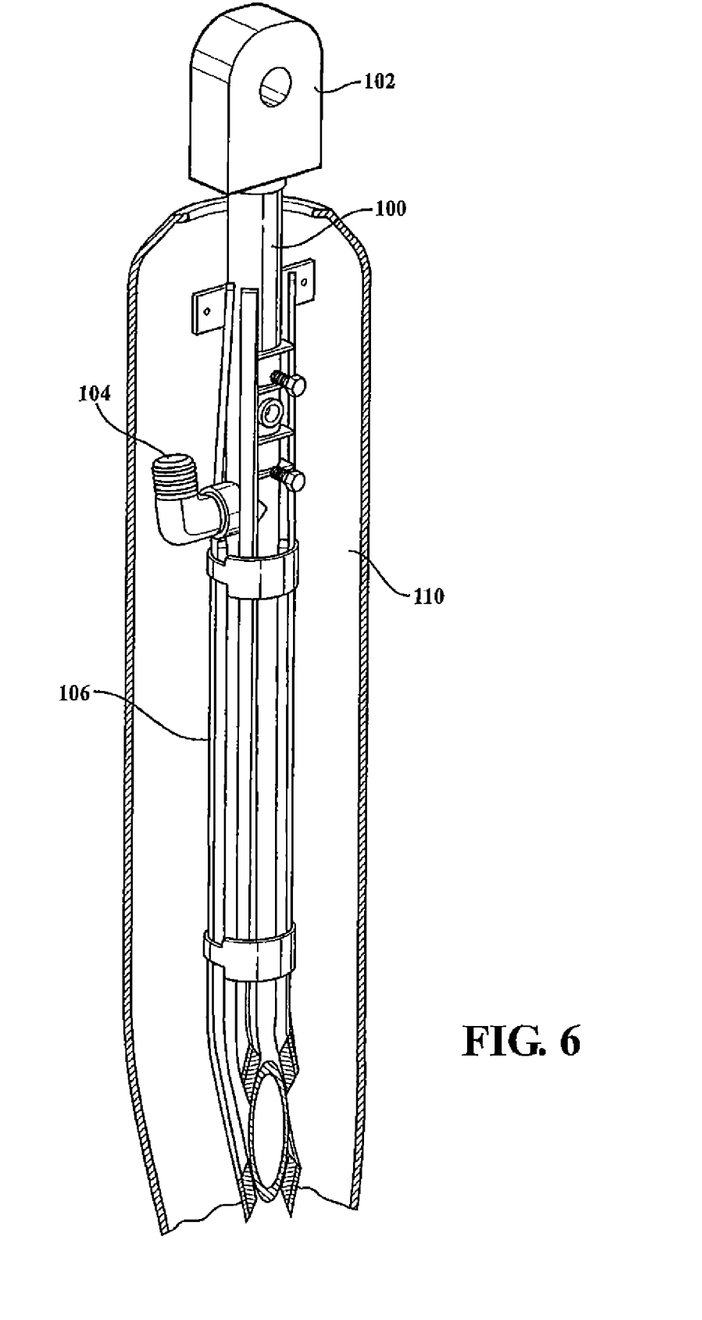
FIG. 6 is a perspective view of a detail of the arm of FIG. 5 with the outer sleeve broken away.
Figure 10:
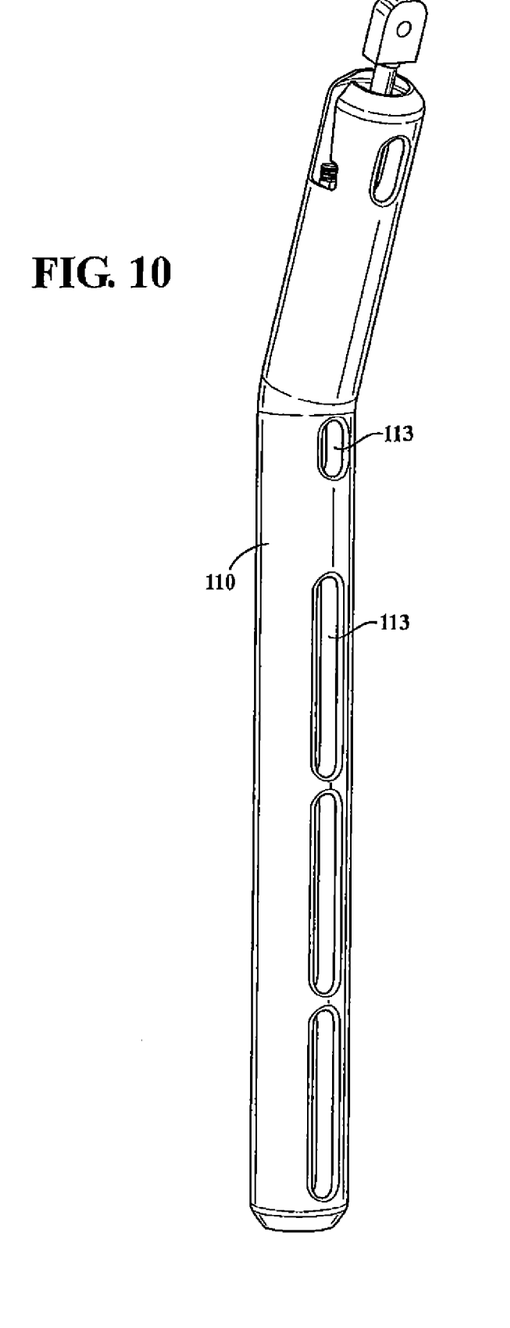
FIG. 10 is a perspective view of an alternative spray arm construction.

Referring to FIGS. 5, 6 and 10, the arm 26 is shown to comprise a metal pipe 100 which is connected at the upper end to the detent block 102 forming part of the knuckle 78. A fluid supply fitting 104 is connected as a T-fitting into the conduit 100 to supply fluid to nozzles 108 located along the center pipe 100. LED strips 106 run down the sides of the internal structure of the arm as shown in this figures and are capable of being activated in red, green, blue colors as well as combinations thereof to provide both constant or intermittent "flashing" lighting effects. The structure just described is surrounded by an 8" diameter plastic sleeve 110 which is preferably a translucent milky or neutral colored casting of polyethylene with enough EVA or other elastomer mixed into it to make the material resilient and, as a consequence, tolerant of occasional inadvertent contact with, for example, a vehicle bumper or side view mirror without damage or denting. The EVA/alloyed polyethylene transmits light from the LEDs on the strips 106 efficiently and also diffuses the light from the LEDs so as to create a fuller, more aesthetically pleasing lighting effect. Holes or ports 113 are cast into the sleeve 110 to provide nozzle spray outlets. It is to be noted, however, that the spray arm 26 may be illuminated by lighting systems other than RGB LEDs as well as lights which are different in physical characteristic and/or are mounted externally of the arm as will be apparent to persons skilled in the lighting arts. The internal illumination of the arm 26 under the control of computer 32 is preferred for reasons hereinafter described with reference to the flowchart of FIG. 7.

Figure 7:
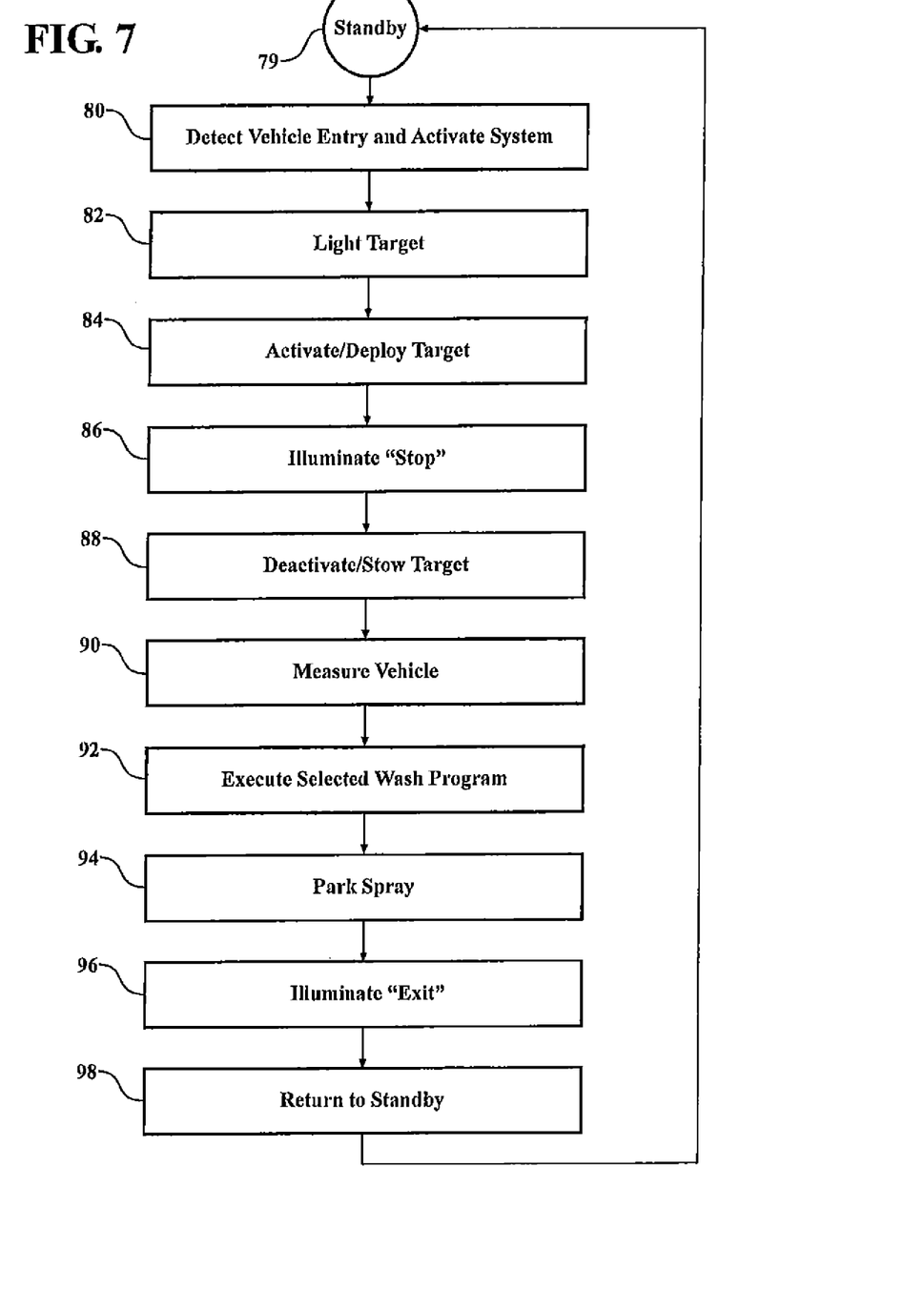
FIG. 7 is a flow chart of a wash program which may be performed with the apparatus of FIGS. 1-6.

Referring now to FIG. 7, a method of operating the systems thus far described will be explained in detail.

Under normal circumstances, the system 10 of FIG. 1 is in a "standby" condition as illustrated by circle 79 in FIG. 7. In this condition, no fluids are being dispensed and only a minimum amount of electrical energy is being consumed by the various components of the system described above. When the vehicle 28 approaches and/or enters the bay 12, a signal is sent by one of the available devices connected to line 34 to the control computer 32 to cause the system to exit the standby condition 79 and enter an activated condition represented by block 80 in FIG. 7. At this point, power is made available to the motors 54, 56, the sensors 44 and any other sensors that might be associated with the knuckle 78.

The system then progresses under the control of the computer 32 to position or activate a "target" identifying the centerline 14, in this case by illuminating the arm 26 by way of the green LEDs 106 within the envelope or sleeve 110 and causing them to flash. A different arrangement might be used with a different type of target, as hereinafter explained. The control computer 32 then moves to flowchart block 84 to activate and/or deploy the target. In this case, deployment means that the arm 26 is moved from the parked position at the far right hand corner of the bay 12 to the centered or target position shown in FIG. 1 over centerline 14. This is carried out by activating the motor 56 to rotate the arm 26 by way of the pivot 30 and, as necessary, to move the carriage 24 longitudinally to the desired position. That desired position is normally at the far exit and extreme of longitudinal travel but may be nearer at the entry end if a "rabbit" function is provided whereby the driver of the vehicle actually follows the target down the centerline 14 until the target arm 26 comes to a stop. An electric eye set including sender 15 and receiver 17 may be used for this purpose.

As shown in flowchart block 86, when the vehicle 28 achieves the desired position, the control computer 32 illuminates the stop sign 38 to tell the driver that he or she has placed the vehicle 28 in the proper position. Sensing the desired position can be carried out by way of the sensors 44, or by contact wands or electric eyes (not shown) arranged to look across the bay at a point where the system wants the front end of the vehicle 28 to be placed during the subsequent washing and rinsing operations.

Block 90 shows the function of measuring the vehicle by way of the sensors 44 so as to define the extent of longitudinal travel which will be needed during the washing and rinsing steps. A shorter vehicle is best washed with less longitudinal travel so that the spray is close enough to the vehicle to produce the desired effects.

The system under the control of computer 32 progresses to the wash program represented by block 92. This program may involve several circuits of the arm 26 around the vehicle during which circuits pre-wash and wash fluids are sprayed under pressure onto the exterior surfaces of the vehicle 28. This is followed by a rinsing function and any other elected functions such as the dispensing of rustproofing chemicals and/or waxes, as well as blow-drying. Examples of other chemicals which might be dispensed selectively at this time will be apparent to persons knowledgeable in commercial car wash operations; e.g., non-spotting rinse chemicals.

After the wash/rinse program 92 has been executed, the system activates the motors 54, 56 to return the arm 26 to the parked position at the far right corner of the bay. As shown in block 96 an exit message is illuminated by way of a sign 38 or its equivalent and the driver of the vehicle 28 drives the vehicle through the exit 42. The system, as shown in block 98, returns to the standby condition 79. Depending on the bay design, it may be necessary to back the vehicle out of the bay.

There are of course many variations in the basic sequence described immediately above and some of those variations will be described in this document in subsequent paragraphs.

Figure 9:
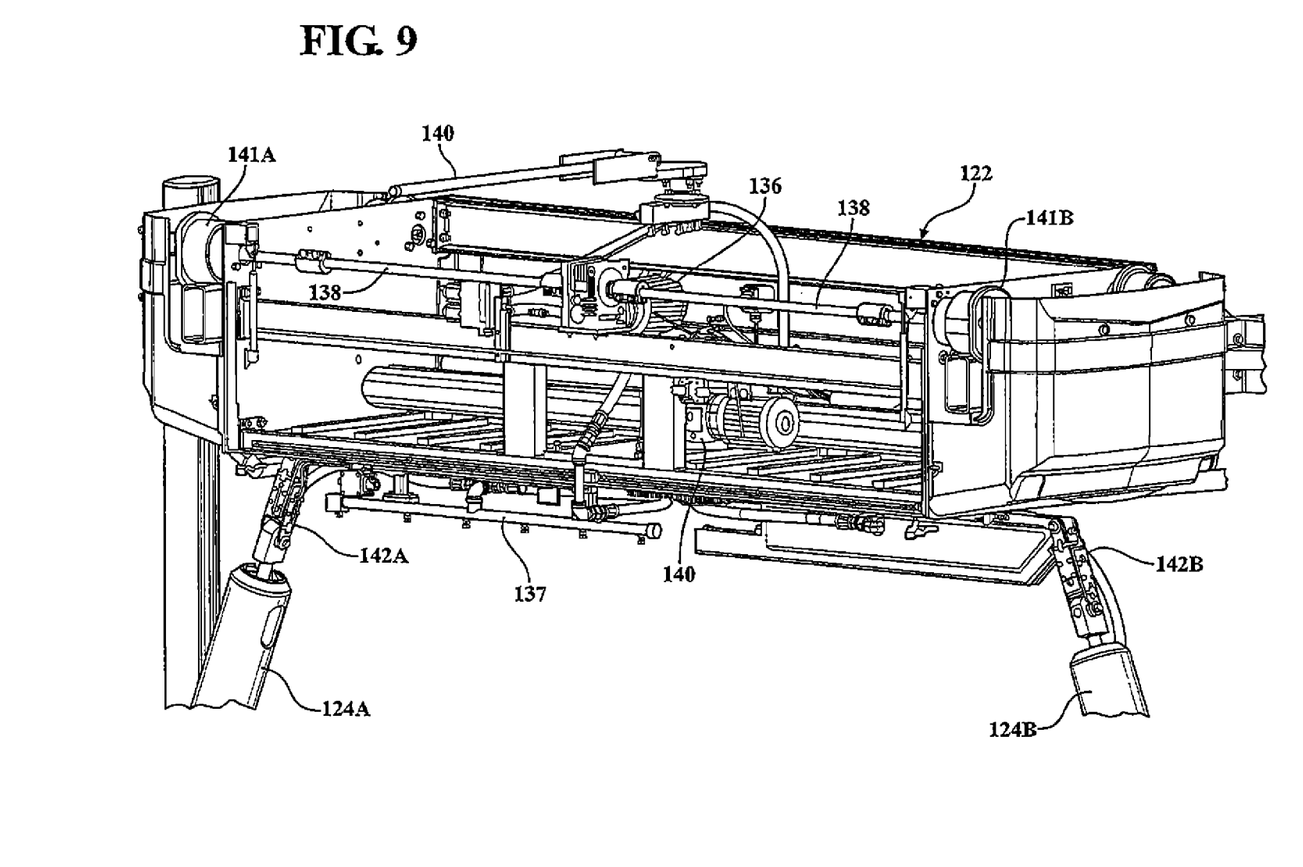
FIG. 9 is a detailed perspective view of a carriage for a twin-arm system of the type shown in FIG. 8.

Looking now to FIGS. 8, 9 and 10, there is shown a vehicle 112 parked essentially on the centerline 114 of the wash bay essentially defined by four upright beams 116A, 116B, 116C and 116D. The beams 116 carry crossbeams 118A, 118B which in turn carry a longitudinal railway defined by spaced-apart parallel beams 120A, 120B which are approximately 30' long. The railway supports a carriage 122 which is generally similar to the carriage 24 described with reference to FIGS. 3 and 4, certain important exceptions being hereinafter described. One important exception is that the carriage 122 as pivotally dependingly connected thereto a pair of reversely similar spray arms 124A, 124B which are constructed essentially as described above with reference to FIGS. 2-6; i.e., those spray arms are constructed using translucent plastic sleeves or envelopes with internal LEDs so that they may be selectively or controllably illuminated. The arms 124A, 124B also carry fluid supply conduits and spray nozzles for dispensing fluids toward the vehicle 112 during washing and rinsing operations in the manner described above. Down-looking sensors 126A, 126B are mounted on the carriage 122 to find the ends of the vehicle for the purposes described above. In this case, a pair of dryer turbines 128 is mounted on the carriage 122 to direct a high velocity stream of air onto the vehicle 112 after the washing and rinsing operations are completed thereby to provide for the removal of residual water from the surface of the vehicle 112. Additional blowers 130A, 130B are provided on the uprights 116A, 116B respectively to dry the sides of the vehicle 112 as it exits the bay. A boom 132 projects outwardly from the right hand wall of the bay and has pivotally connected thereto a flexible supply arm 134 which is appropriately connected to the carriage 122 to supply both fluids and electrical power.

As shown in FIG. 9, the boom 134 has a fluid supply pipe 140 which is connected through the carriage 122 to the supply conduits in the arms 124 as well as to the horizontal spray manifolds 137.

A motor 136 is provided with a gear box as described above, which in turn is connected to drive shafts 138. Those drive shafts are connected to wheels 141A, 141B to provide controlled forward and reverse longitudinal motion of the carriage 122 along the railway described above. An additional motor gear box combination 140 is provided for the purpose of controlling the swinging rotation of the arms 124 in reversely similar "butterfly" wing fashion all as is more specifically described in reissue patent RE 40,463 assigned to Belanger, Inc. of Northville, Mich.

The spray aims are provided with four-way breakaway knuckles 142A, 142B which in turn are provided with sensors to indicate a movement away from the normal operating condition.

The system of FIGS. 8 and 9 functions essentially as is described in the text referring to FIG. 7; provided, however, that the step of deploying the target as carried out by activating motor/gear set 140 to bring the arms 124 together in closely adjacent, even touching, side-by-side positions on the centerline 114 of the bay to provide a navigational target for the driver of the approaching vehicle 112. The arms 124 may be brought to the target position from a parked position in which the arms are spread laterally. The arms 124 are also illuminated when in the target position preferably with a green light which is caused to blink intermittently.

In the operation of both the systems of FIGS. 1-6 and 8 and 9, different lighting effects are provided at a controlled computer 32 during the execution of the various steps of the wash/rinse program. By way of example, a different LED color may be generated by selected activation of the selected R/G/B LEDs within the arms 124 so that a different color is displayed during each washing step. This lighting effect may be provided in combination with the lighting of a billboard-type sign (not shown) which is visible to the driver of the vehicle during a washing operation and the colors of that sign may be caused to coincide with the colors associated with the lighting effects of the spray arms during the entire multi-step operation.

After the double-arm washing and rinsing program has been completed, the arms 124 may be returned to the parked position and the system returned to standby status.

Figure 11:
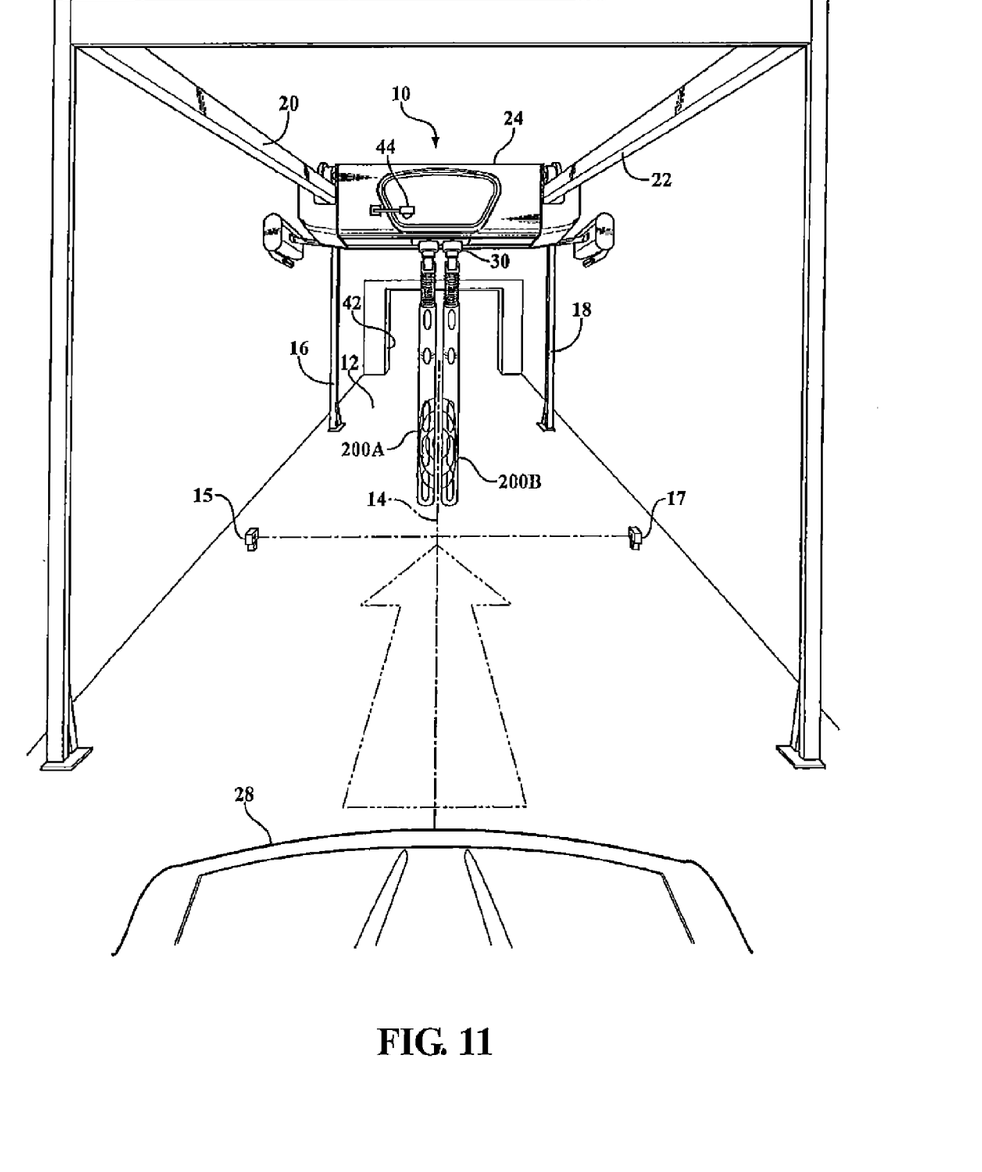
FIG. 11 is a perspective view of a twin arm wash system in the enclosed bay with the arms in a centered target position.

Referring to FIG. 11, there is shown an alternative arrangement for providing a centering target in a car wash bay defined by vertical uprights 16, 18 supporting parallel, spaced-apart railway beams 20, 22. A double pivot 30' is used to bring the arms 200A, 200B together to form a target. After the vehicle 28 is in position, the arms operate as generally described in RE 40,463 to wash the vehicle. Arms 202A and 202B are lighted by internal LEDs as described above with reference to FIGS. 5, 6 and 10.

Figure 12:
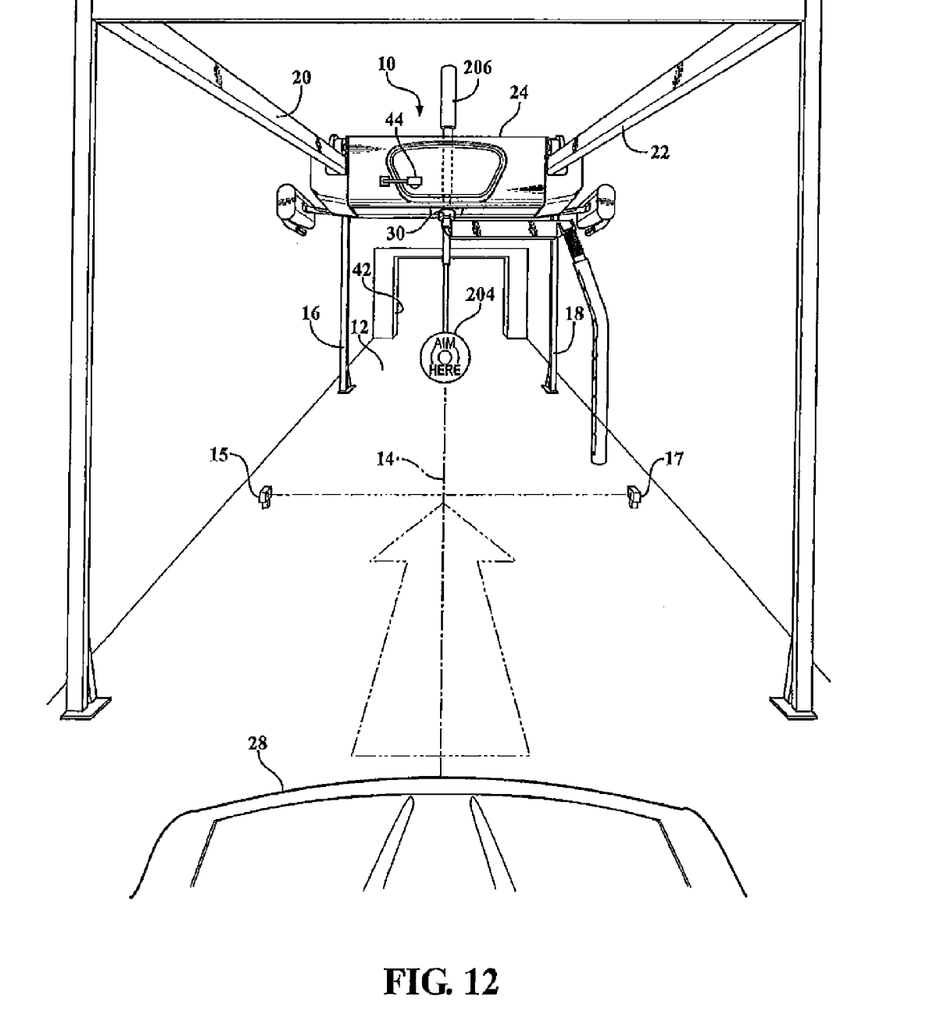
FIG. 12 is a perspective view of a wash bay with a telescopically deployable sign used for centering.

FIG. 12 shows an alternative target in the form of a sign 204 stowed and deployed in a position coincident with the centerline 14 of the bay. The sign 204 may also be illuminated as indicated to carry out step 82 of the sequence shown in FIG. 7. This deployable/stowable target 204 is mounted on the end of a telescopic arm 206 which may be deployed by air pressure to bring sign 204 into the position shown and later stow the sign near the ceiling of the bay when it is time to start the wash program. The bay 12 and wash equipment therein is as described above with reference to FIG. 1.

Various alternative systems may also be used to provide the centering target. For example, a pivotally deployable target may be brought into position on the centerline 14 by air pressure or a power cylinder and returned to a stowed position by cutting off the air pressure. The target may rise up from the floor or drop down from above. Illumination may be provided as desired either externally or internally by simple spotlights.

It will be appreciated that the embodiments illustrated in the drawing and described above are exemplary and that implementation of the invention can be carried out in various other configurations.

What is claimed is:

1. A system for spray washing vehicles in a defined area comprising:
    an overhead carriage movable over the area;
    a pair of spray arms pivotally mounted to the carriage so as to depend vertically therefrom into the area and be movable around opposite sides of a vehicle for purposes of washing the vehicle;
    each of said arms comprising a length of fluid conduit having a series of spaced-apart spray nozzles connected thereto, and a hollow translucent plastic sleeve in surrounding relationship to said length of fluid conduit; and
    a plurality of light devices disposed within the sleeve along the length of said conduit for illuminating the sleeve along its length when activated so as to be visible to a driver in a vehicle entering the area; and
    a control system for placing said arms in a pre-determined position and illuminating the arms by activating said light devices during entry of the vehicle into said area and thereafter causing the arms to move around the outside of the vehicle for purposes of washing the vehicle while the light devices remain illuminated.

2. The system as defined in claim 1 further wherein each of the arms is connected to said carriage by a breakaway knuckle which allows the arms to be pivotally moved upwardly and away from a vehicle in the event of accidental contact between a vehicle and an arm.

3. The system as defined in claim 2 wherein the breakaway knuckle provides two orthogonal breakaway axes of pivotal movement.

4. A system as defined in claim 1 wherein the light devices are LEDs.

5. A system as defined in claim 4 wherein the LEDs are provided in strings of different colors.

6. A system as defined in claim 5 wherein at least some of the light devices are chosen to produce green-colored illumination.

7. A system as defined in claim 1 wherein the sleeves are made of a resilient plastic material.

8. The system as defined in claim 1 wherein the plastic material diffuses light.

9. A system for spray washing vehicles in a defined area comprising:
    a longitudinal support mounted overhead of said area;
    a carriage mount on said support;
    a pair of spray arms pivotally mounted to said carriage and of sufficient length to extend dependingly from said support into said area adjacent the sides of a vehicle in said area;
    each arm including an elongate fluid conduit having a plurality of spray nozzles mounted at intervals there along to direct fluids at the outside surfaces of a vehicle in said area;
    a first power device for driving the carriage along said support, and a second power device for pivotally driving said arms relative to said carriage;
    each arm further including an elongate translucent plastic envelope surrounding said fluid conduit;
    each arm further including an illumination system comprising multiple light sources arranged along the length of the arm to illuminate the length of the arm when activated, wherein the light sources are mounted inside of said envelopes; and
    a control means for activating said light sources and causing said arms, while illuminated, to move relative to a vehicle in said area.

10. A system as defined in claim 9 wherein each of the envelopes is substantially tubular and made of a resilient plastic.

11. A system as defined in claim 10 wherein each of said arms comprises a first substantially horizontal portion adjacent to and pivotally mounted to said support and a second substantially vertical portion in fluid communication with said first substantially horizontal portion and extending downwardly from said first substantially horizontal portion fully into said area, each of said first and second portions having a plurality of nozzles for dispensing fluids toward an outside surface of a vehicle in said area;
    said illumination system and said tubular envelope being connected to said second substantially vertical portions.

12. A system as defined in claim 9 wherein the control means is programmed to place said arms in a target position to direct the vehicle into said area and to illuminate said arms while in the target position as well as while the arms perform a washing function.

13. A system as defined in claim 12 wherein the target position is chosen such that the arms are arranged on opposite sides of a longitudinal center line of said area.

* * * * *